US 6,549,131 B1

(12) United States Patent
Cote et al.

(10) Patent No.: US 6,549,131 B1
(45) Date of Patent: Apr. 15, 2003

(54) SECURITY DEVICE WITH FOIL CAMOUFLAGED MAGNETIC REGIONS AND METHODS OF MAKING SAME

(75) Inventors: Paul F. Cote, Hollis, NH (US); Gerald J. Gartner, Hollis, NH (US); Stephen B. Curdo, Hollis, NH (US); Daniel J. Leeds, Manchester, NH (US); Gary R. Wolpert, Mason, NH (US); Timothy T. Crane, Windsor, MA (US)

(73) Assignees: Crane & Co., Inc., Dalton, MA (US); Technical Graphics Security Products, LLC, Milford, NH (US)

( * ) Notice: Subject to any disclaimer, the term of this patent is extended or adjusted under 35 U.S.C. 154(b) by 300 days.

(21) Appl. No.: 09/684,851

(22) Filed: Oct. 6, 2000

Related U.S. Application Data

(60) Provisional application No. 60/158,282, filed on Oct. 7, 1999.

(51) Int. Cl.⁷ .............................................. G08B 13/14
(52) U.S. Cl. ............................... 340/572.1; 340/572.8; 340/5.86; 194/213; 283/82; 283/83; 428/209; 428/457; 428/916; 235/441; 235/449; 235/492; 235/493
(58) Field of Search ............................ 340/572.1, 572.8, 340/568.1, 5.86, 5.8, 5.2; 194/213, 302, 303, 320; 283/82, 83, 84, 85, 93; 156/277, 231; 428/209, 381, 389, 399, 400, 457, 916, 211, 373; 235/449, 441, 451, 456, 444, 493, 488, 492

(56) References Cited

U.S. PATENT DOCUMENTS

| 4,044,231 A | 8/1977 | Beck et al. ............... 235/61.12 |
| 4,183,989 A | 1/1980 | Tooth .......................... 428/195 |
| 4,446,204 A | 5/1984 | Kaule et al. ................ 428/323 |
| 4,511,616 A | 4/1985 | Pitts et al. .................. 428/203 |
| 4,584,529 A | 4/1986 | Aoyama ...................... 324/261 |
| 4,631,222 A | 12/1986 | Sander ....................... 428/172 |
| 4,631,223 A | 12/1986 | Sander ....................... 428/172 |
| 4,652,015 A | 3/1987 | Crane ........................... 283/91 |
| 4,869,778 A | 9/1989 | Cote ........................... 216/103 |
| 4,943,093 A | 7/1990 | Melling et al. ............... 283/83 |
| 4,960,651 A * | 10/1990 | Pettigrew et al. ........... 428/607 |
| 4,980,569 A | 12/1990 | Crane et al. ................ 250/556 |
| 5,016,919 A | 5/1991 | Rotondo ....................... 283/82 |
| 5,042,842 A | 8/1991 | Green et al. ................ 283/101 |
| 5,043,201 A | 8/1991 | Cote ........................... 428/195 |
| 5,093,184 A | 3/1992 | Edwards ..................... 428/195 |
| 5,112,672 A | 5/1992 | Kaule et al. ................ 428/209 |
| 5,113,062 A | 5/1992 | Fujita et al. ................ 235/493 |

(List continued on next page.)

FOREIGN PATENT DOCUMENTS

DE        195 48 528 A     6/1997

OTHER PUBLICATIONS

Richard Tucker; "Portals and Tagsa make their mark in secure labels" article (date unknown).
De La Rue Holographics; "The Mark of Authenticity" brochure; Pub. In Hampshire, England (date unknown).

*Primary Examiner*—Benjamin C. Lee
(74) *Attorney, Agent, or Firm*—Holland & Bonzagni, P.C.; Mary R. Bonzagni, Esq.

(57) ABSTRACT

A method of covering, embedding or burying magnetically encodable regions, invisible to the naked eye at least on one side, in a magnetic/metallic security device begins by providing a security device carrier substrate having an imaged metallic region. A foil film is provided on a release coated carrier film. One or more magnetic regions are provided on either the foil film layer or the carrier substrate. Patterned, flat, or roller heated dies are used to contact and bond the foil film to the security device carrier substrate in at least those regions of the magnetic regions thereby producing a security device having covered, embedded or camouflaged magnetically encodable regions.

34 Claims, 5 Drawing Sheets

U.S. PATENT DOCUMENTS

| | | | |
|---|---|---|---|
| 5,190,318 A | 3/1993 | Mantegazza | 283/82 |
| 5,196,681 A | 3/1993 | Mantegazza | 235/449 |
| 5,265,916 A | 11/1993 | Coe | 293/72 |
| 5,279,403 A | 1/1994 | Harbaugh et al. | 194/207 |
| 5,284,363 A | 2/1994 | Gartner et al. | 283/81 |
| 5,308,992 A | 5/1994 | Crane et al. | 250/556 |
| 5,354,099 A | 10/1994 | Kaule et al. | 283/85 |
| 5,383,687 A * | 1/1995 | Suess et al. | 283/86 |
| 5,388,862 A | 2/1995 | Edwards | 283/82 |
| 5,394,969 A | 3/1995 | Harbaugh | 194/206 |
| 5,417,316 A | 5/1995 | Harbaugh | 194/206 |
| 5,419,424 A | 5/1995 | Harbaugh | 194/206 |
| 5,457,382 A | 10/1995 | Stein | 324/239 |
| 5,486,022 A | 1/1996 | Crane | 283/83 |
| 5,516,153 A | 5/1996 | Kaule | 283/85 |
| 5,535,871 A | 7/1996 | Harbaugh | 194/206 |
| 5,543,911 A | 8/1996 | Jeffers | 356/71 |
| 5,545,885 A | 8/1996 | Jagielinski | 235/449 |
| 5,582,927 A * | 12/1996 | Davies | 428/611 |
| 5,583,631 A | 12/1996 | Lazzerini | 356/71 |
| 5,599,047 A | 2/1997 | Kaule et al. | 283/85 |
| 5,601,931 A | 2/1997 | Hoshino et al. | 428/537.5 |
| 5,614,824 A | 3/1997 | Dames et al. | 324/239 |
| 5,639,126 A | 6/1997 | Dames et al. | |
| 5,697,649 A | 12/1997 | Dames et al. | 283/83 |
| 5,786,587 A | 7/1998 | Colgate, Jr. | 235/487 |
| 5,803,503 A | 9/1998 | Kaule et al. | 283/85 |
| 5,949,050 A | 9/1999 | Fosbenner et al. | 235/449 |
| 6,086,708 A * | 7/2000 | Colgate, Jr. | 156/277 |
| 6,146,773 A | 11/2000 | Kaule | |
| 6,440,522 B1 * | 8/2002 | Duschek et al. | 428/76 |
| 6,454,166 B1 * | 9/2002 | Stenzel et al. | 235/449 |
| 6,474,695 B1 * | 11/2002 | Schneider et al. | 283/72 |

\* cited by examiner

SECURITY DEVICE WITH FOIL CAMOUFLAGED MAGNETIC REGIONS AND METHODS OF MAKING SAME

RELATED APPLICATIONS

This application claims the benefit of U.S. Provisional Patent Application Ser. No. 60/158,282 filed Oct. 7, 1999, fully incorporated herein by reference.

FIELD OF THE INVENTION

This invention relates to security and authentication devices and more particularly, to a method for producing a security/authentication device having visually camouflaged magnetically encoded information and to a security device resultant therefrom.

BACKGROUND

Security devices or threads and other authentication devices are nearly always used in currency and other important papers, negotiable instruments or product wrappings. These security threads provide a visual and/or mechanical (i.e. machine readable) means of verifying the authenticity of the object to which the security/authentication device is attached or embedded such as high-priced items; easily counterfeited items including currency and other negotiable instruments; tickets to special events; and even consumer products such as pharmaceuticals, certain clothing, liquor and the like, all of which are or have been subject to counterfeiting.

One method of object authentication involves embedding a machine-readable security feature either alone or in combination with a visually discernible security feature in the security/authentication device. The machine readability of at least that portion of the security/authentication device allows a machine to verify the authentication of the object to which the security/authentication device is attached, thereby eliminating human error in such authentication and also speeding up the process of authentication.

Machine-readable security features are often generally provided using one or more magnetic regions which are generally opaque on a clear plastic substrate and which can be encoded (such as by magnetizing) in the security/authentication device. As with security/authentication devices having only a visual authentication methodology, those with only machine readable authentication features or machine readable authentication features in combination with visual authentication features can be more easily counterfeited if the potential counterfeiter can detect the presence and/or placement of the magnetically encoded region to read and reproduce it. If the magnetic or other machine readable information cannot be visually seen, the counterfeiter will not generally know to reproduce this information and therefore the counterfeiting will fail and be easily detected.

SUMMARY OF THE INVENTION

The present invention features a method for camouflaging, using one or more metalized foil layers, one or more magnetic regions on a security device, such as a thread, which can be embedded in an instrument requiring authentication such as paper currency or other negotiable instrument and a resultant security device.

The item or article to which the security device is attached can be any article susceptible to counterfeiting or reproduction. In one example, the security device is used with security papers including, but not limited to, bank notes, checks, money orders, passports, visas, titles, registrations, licenses, original documents, certificates of authenticity, and gift certificates. In another example, the security device is used with tickets including, but not limited to, lottery tickets, event tickets and transit tickets. In a further example, the security device can be used with labels or packaging materials including, but not limited to, collars, (heat-shrink, glued, etc.), labels (pressure sensitive, glued, woven, in-mold), tear-tapes, over wrap, and inserts. In yet a further example, the security element 10 is used in laminated items including, but not limited to, ID cards, badges, passports, credit/debit cards, immigration documents, access cards, licenses, and credentials. The present invention also contemplates using the security device in woven textile materials, molded plastics, glass laminates, tamper-evident devices, and decals.

In this manner, security devices such as security "threads" with encoded or encodable magnetic regions can be decoded and authenticated only by a machine programmed to locate and read the encoded magnetic media. The magnetic region or media is thus not visually discernible, and therefore much less subject to decoding and duplication by unauthorized sources.

The use of a metalized foil (typically initially provided on a release coated carrier film, such as a polyester, with a release layer allowing the foil to be transferred to the security device), as a camouflaging or one sided hiding element in a security device, such as a security thread, is provided due to the fact that foil exhibits excellent light blocking, light reflecting and opacity capabilities per unit thickness, making it a superb material to utilize in such an application. This is in contract with the prior art materials and constructions which would be substantially thicker for similar constructions. In addition, the use of foil and foil transfer methods provides a process that is easy to implement, reliable, can be more easily aligned to create aligned magnetic/metal patterns, and can be integrated in the process of manufacturing security devices.

In one embodiment, the method starts by providing a security film or base in the form of a polyester carrier substrate with or without visual indicia although typically, the security film will include visual indicia. The visual indicia preferably includes an imaged metallic layer including both metalized and demetalized regions. The imaged metallic layer can be created using techniques well known in the art including demetalization techniques, the printing of metalized images or other indicia or the provision of a foil (metalized) layer.

In one embodiment, an adhesive material is applied over one entire surface of the imaged metallic layer. A foil film is next provided. The foil film includes a carrier layer of a polyester material approximately 0.0005 inches thick having a release lining on at least one side. Applied to the release lining side of the carrier layer is a thin aluminum or other metalized layer.

In one embodiment, one or more magnetic regions, in the form of magnetic slurry media or other similar substance, are applied over the entire bottom surface of the foil film although the magnetic slurry can alternatively or additionally be selectively applied to the foil film such as by printing using magnetic inks. The selective application of the magnetic media will generally coincide with the metallic of foil regions provided on the base or carrier substrate to fully enclose and camouflage the magnetic regions. In another embodiment, the magnetic regions may not coincide with the metallic regions and may be covered only on one side by the foil film.

In yet another embodiment, the metallic layer may be printed with a magnetic ink in a predetermined pattern. The magnetic ink may be a composite including a chemical resist which serves to render the composite resistant to a metal reactant solvent, thus providing a metallic/magnetic aligned or registered pattern. The composite may also or alternatively include a heat and/or pressure activatable adhesive.

Next, the foil film and the security device with imaged metallic layer are bonded under heat and pressure. A heated flat, patterned or rotary die causes transfer of the foil layer with or without an applied magnetic layer or region to the base security device. The magnetic area can be encoded while the foil aluminum region covers the magnetic region at least on one side thereby preventing visual detection and decoding.

In another embodiment, the magnetic region(s) may be applied to one surface (the top surface) of the security device and the foil applied over only the magnetic region(s) or over the entire surface of the security device.

Thus, a security device with a buried magnetic code, which is invisible to the naked eye at least from one side, is produced.

In another embodiment, a security device with an imaged metallic layer, as previously described, is provided. In this embodiment, a foil film on which has been applied stripes of magnetic media across the width of the foil film is provided. The foil film is generally constructed of an aluminum or other metallic layer applied over a release lining and a polyester carrier substrate.

In this embodiment, a planar, heated die is provided which transfers the stripes of magnetically encodable material and an aluminum or other metallic covering to the security device, thus forming a security device or a thread having stripes of magnetically encodable material which are covered or camouflaged from the naked eye beneath a metallic (foil) layer.

BRIEF DESCRIPTION OF THE DRAWINGS

The invention will be better understood by reading the accompanying detailed description taken together with the drawings wherein.

DETAILED DESCRIPTION OF THE PREFERRED EMBODIMENT

The present invention features a method of producing a security device using foil transfer techniques, which camouflages (at least on one side) or buries magnetic or other opaque machine readable information within the security device without making it visible to the naked eye (at least from one side). The terms opaque machine readable information or magnetically encodable material or magnetic area, as used herein, are intended to mean indicia comprising or formed by any machine testable, inherently colored material that is generally impervious to the passage of light.

Although the present invention utilizes well known techniques for bonding two films together using heated dies, the present invention features a novel method for producing a security device having buried or camouflaged encodable magnetic regions which are non-apparent to the naked eye and which are thin enough to be used in negotiable instruments or other devices including paper currency or other uses where the possibility of counterfeit is high.

Figure 1A:
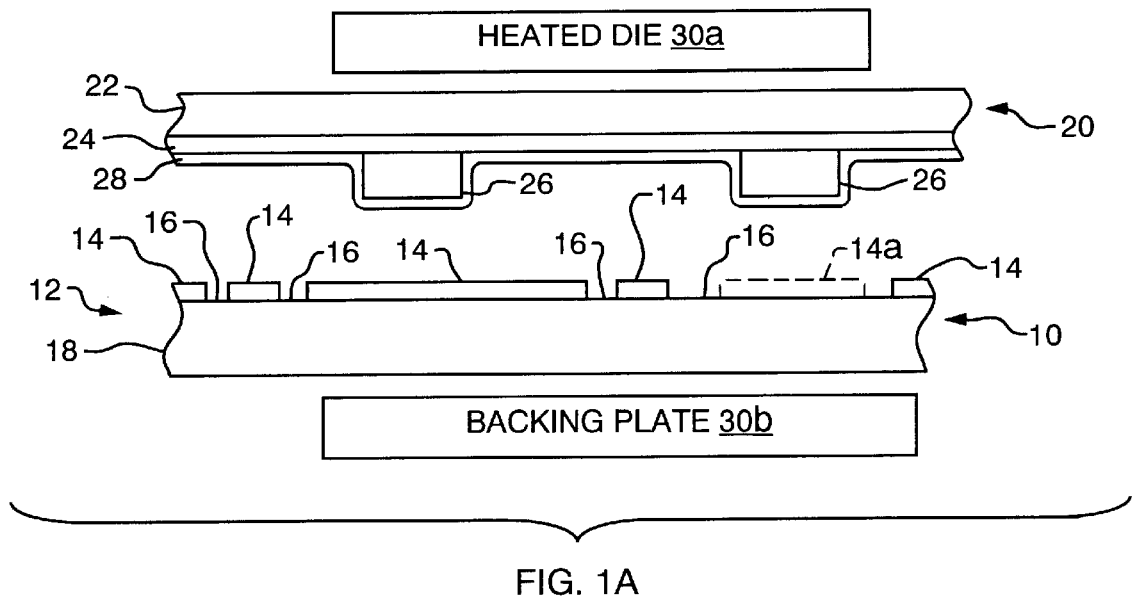
FIG. 1A is a schematic diagram of the foil film and imaged metallic security device layers used to form the security device with camouflaged or buried magnetic code according to one embodiment of the present invention.

In a first embodiment of the present invention, a security device 10, FIG. 1A, including a top surface having an imaged metallic layer 12 having one or more metalized regions 14 and non-metalized regions 16 is provided. Optional areas of metalization are shown at 14a. The imaged metallic layer 12 is applied over a generally clear polyester carrier substrate 18 typically having a thickness of approximately 0.0005 inches, as is well known in the art. Further, the imaged metallic layer 12 may be made by one or more well-known technique including demetalization or conventional, gravure or screen-printing techniques including an imaged metallic layer including metallic and nonmetallic regions.

In accordance with the preferred embodiment, a foil film layer 20 comprised of a polyester carrier substrate 22 and a metallic foil region (such as aluminum) 24 is provided. In one embodiment, and one or more magnetic stripes or regions 26 is also provided although the entire foil film layer 20 may be flood coated with a magnetic layer. In one embodiment, a layer of adhesive 28 is applied over the aluminum region 24 and/or the magnetic regions 26 to bond with the security device layer 10 as would be described further below. The adhesive layer 28 is preferably an adhesive of the heat sealable type available from National Starch Company. Alternatively, the magnetic regions may include, as part of their formulation, a heat or pressure activated adhesive in which case the adhesive layer will not physically be present will be functionally present as part of the composition of the magnetic layer/region(s) 26.

In this embodiment, the foil film carrier substrate 22, includes a release layer at the interface between the polyester carrier 22 and the foiled film layer 24. The polyester carrier substrate layer 22 is generally approximately 0.0005 inches thick.

The aluminum metal layer 24 is provided on a polyester carrier substrate 22 and is approximately 200 Angstroms thick, while the magnetic encoded regions 26, in this embodiment, are applied to the foil film layer 20 using conventional, screen or gravure printing techniques. The magnetic regions 26 are approximately 1–20 microns thick.

Figure 1B:
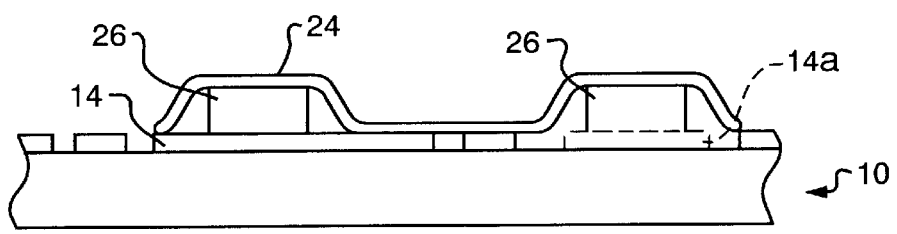
FIG. 1B, is a schematic cross-section of a finished security device with embedded and camouflaged magnetic region according to the method disclosed in FIG. 1A.

Once the two films have been provided and film registration has been accounted for (as is generally well known in the art), the two films are fused or bonded together utilizing pairs of heated dies 30a and 30b which transfer the metallic layer 24 and magnetic regions 26 to the underlying security device 10, FIG. 1B in those areas of the heated die, resulting in the structure shown in FIG. 1B including one or more magnetic regions 26 over which is disposed a metallic layer 24 in the form of a foil film, which camouflages or hides the magnetic regions 26, at least from one side, from the naked eye, while allowing the magnetic regions 26 to be magnetically encoded and decoded (providing machine readability) to achieve authentication.

With the present invention, a magnetic/metal security device with hidden magnetics at least from one side and having a thickness of between 25 microns and 35 microns is provided which is well within the specification of 0.040 inches for most security threads or devices, as compared to the prior art of printing magnetic bars covered by silver ink of the like which results in a significantly thicker security device which is not usable in many processes in use today such as in paper to be used for currency and the like.

Figure 2A:
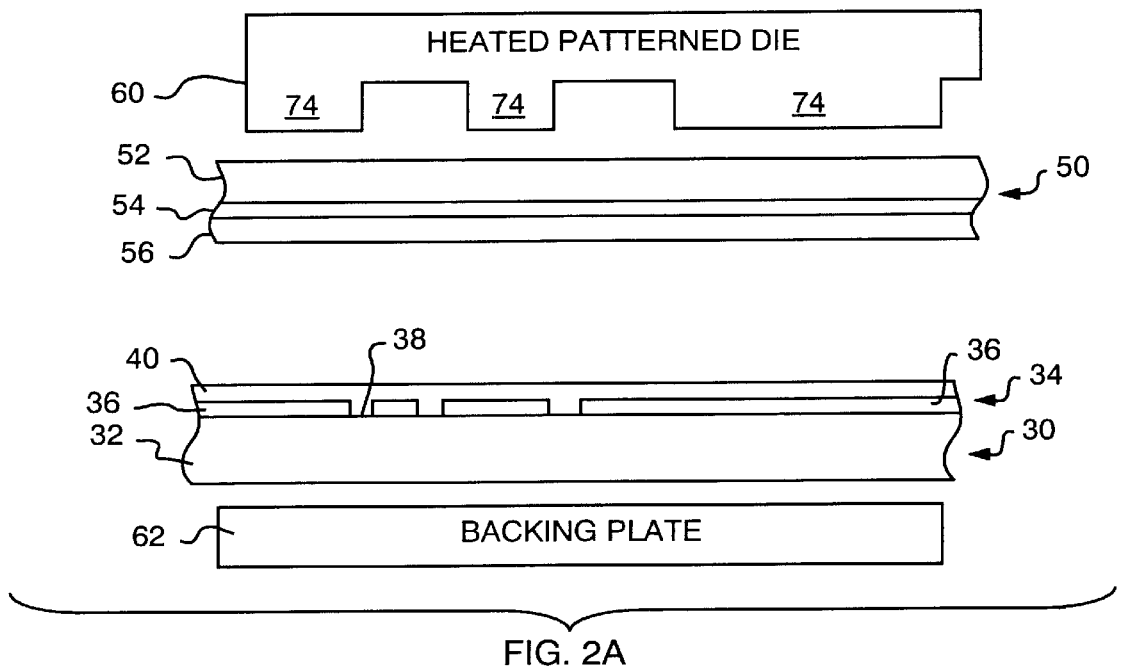
FIG. 2A is a schematic diagram of the foil film and imaged metallic security device layers used to form the security device with camouflaged or buried magnetic code according to another embodiment of the present invention.

In another embodiment of the present invention, the method starts by providing a security device 30, FIG. 2A, including a polyester carrier substrate 32 over which is provided an imaged metallic layer 34 comprising metalized regions 36 as well as non-metalized regions 38. In one embodiment, a layer of adhesive 40, such as a heat sealable adhesive available from National Starch Company is applied over the imaged metallic layer 34 to provide bonding with the magnetic region 56 of the foiled film layer 50 as will be explained below. Alternatively, as previously disclosed, the magnetic layer 56 may be a composite layer including a heat and/or pressure activatable adhesive. In addition, the composite magnetic layer may also include a chemical resist which serves to render the composite magnetic region resistant to a metal reactant solvent.

A foil film layer 50 is provided including a polyester carrier substrate and release layer 52 over which is applied an aluminum or other metalized layer 54. A magnetic layer 56 is applied as a slurry or other coating over the entire bottom surface of the foil film 50 over the metallic layer 54.

Figure 2B:
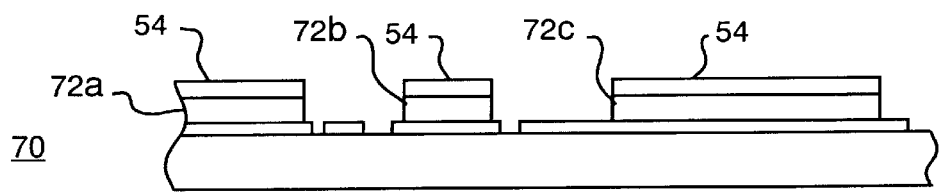
FIG. 2B is a schematic cross-section of a finished security device with embedded and camouflaged magnetic region according to the method disclosed in FIG. 2A.

In order to bond the foiled film 50 with the security device 30, a heated, patterned die 60 is used in connection with heated die 62 using conventional foil transfer techniques to provide the structure 70, FIG. 2B, including magnetic regions 72a–72c covered by metallic foil regions 54 corresponding to those regions 74 of heated, patterned die 60 which engage with the mating unpatterned heated die 62, to form a security device 70 having camouflaged or invisible magnetically encodable regions 72 covered by metallic foil regions 54.

Figure 3:
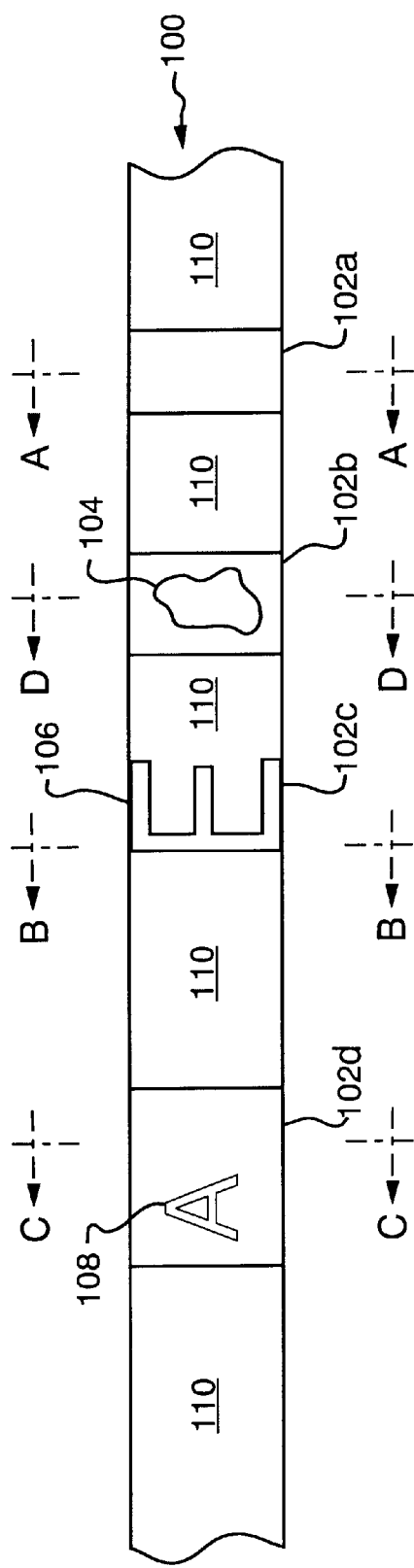
FIG. 3 is a schematic. diagram of a finished security device with embedded and camouflaged magnetic region, according to the present invention.

In accordance with the teachings of the present invention, a magnetic/metallic security device 100, FIG. 3, is provided. The. magnetic/metallic security device provided and fabricated in accordance with the present invention includes one or more regions 102 in accordance with the present invention which include a magnetic security feature embedded or camouflaged within the security device 100.

In one embodiment of the present invention, the region 102a, which includes the magnetic region camouflaged within metallic and foil regions, may have no visible indicia. Such an area may be a narrow strip across the width of the security device 100, as shown at 102a, or alternatively, may be a long area extending down the length of the security device 100. In another embodiment, the area 102b including a magnetic region embedded within the security device and camouflaged by a metallic/foil layer may include, on the surface, visual indicia 104 such as a picture, hologram or other similar graphic indicia printed on the surface of the security device 100 or provided as a diffractive image or diffractive foil layer wherein the top surface of the foil layer includes diffractive indicia or image such as a hologram.

The term "diffractive" as used herein generally means or refers to a predetermined amplitude or phase altering or variation property that acts as an authenticating feature so that the security device 120 itself can be further authenticated, as will be described in greater detail below.

One embodiment of the diffractive indicia 104 includes a frequency shifting additive, such as a pigment in ink used to create an image, disposed on or contained Within at least a top surface of the foil film 130. The frequency-shifting additive has the predetermined frequency shifting property that is detectable to authenticate the security device 10. for example, when excitation radiation having a predetermined excitation frequency excites the frequency-shifting additive on the security device 120, the additive will emit radiation having a different predetermined emitted frequency. The security device is authenticated if the predetermined excitation frequency is emitted at the predetermined emitted frequency, thus confirming the predetermined frequency shifting property of the security device 10.

The excitation frequency and emitted frequency preferably have narrow bands such that the security element 10 is authenticated only for specific excitation/emitted frequencies. The frequency-shifting additive can shift the radiation either up or down within the same spectral region, such as ultraviolet (UV), visible, or infrared (IR) spectral regions, or between different spectral regions. The frequency shifting additives also preferably have an excitation frequency and/or emitted frequency within the infrared spectral region or other non-visible spectral regions to provide a covert security device 120. However, the present invention also contemplates frequency shifting within the UV and visible spectrums. Some examples of the frequency shifting include UV to visible, visible to visible (hologram, for example), visible to IR, IR to visible, and IR-to-IR.

In yet another embodiment, the magnetic region, enclosed by metallic/foil regions may be in substantially identical registration and together form visual indicia 106, such as the letter "E".

In yet another embodiment, the magnetic and metallic layers may be in substantially identical registration and form recesses 108, the recesses forming the visual indicia. This type of visual indicia is often referred to as "clear text". In addition, one or more regions 110 may omit any metallic or magnetic material, and thus, serve as breaks in the metallic and/or magnetic regions. These areas may extend fully or partially across the entire width of the security device 100.

Figure 4:
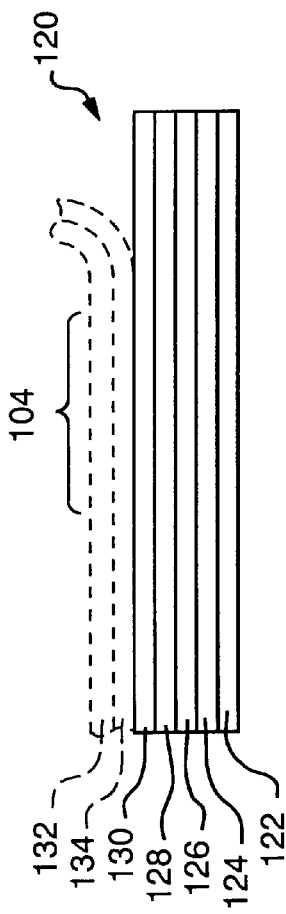
FIG. 4 is a schematic diagram of the cross-section of the security device of FIG. 3 taken along arrows A—A.

FIG. 4 represents a cross-section 120 (not to scale) of security device 100 taken along arrows A—A, B—B, C—C or D—D. The cross-section 120 includes a first or base carrier substrate 122 over which has been provided a metallic layer 124. As is well known in the art, the metallic layer may be provided on the carrier substrate 122 by a number of methods which are well known to those skilled in the art.

The next two layers can be interchanged depending on the method used to fabricate the security device of the present invention. Layers 126 and 128 represent a magnetic layer and an optional adhesive layer. As will be explained in greater detail below, depending on which substrate the magnetic region is applied to and if the magnetic region includes an adhesive component will determine if and where the adhesive layer is provided.

The foil/metallic layer 130 is disposed on top of the magnetic region, thus embedding the magnetic region between the metallic layer 124 and the foil layer 130. The foil layer is applied using a heated die which may either flat, patterned or rotary, and is previously attached to a second polyester carrier substrate 132 on which has been disposed a release layer 134 which allows the carrier substrate 132 to be separated from the foil layer 130, leaving the foil layer behind.

Figure 5A:
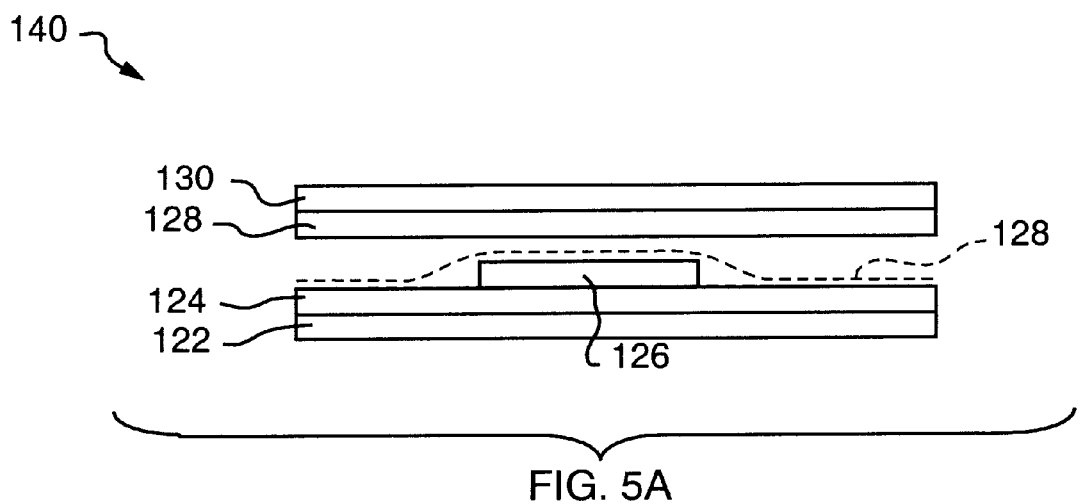
FIG. 5A is a schematic cross-section of a finished security device with embedded and camouflaged magnetic region, according to one embodiment of the present invention.

In one embodiment shown in the cross-section 140, FIG. 5A, the magnetic region 126 is disposed on the first carrier substrate 122, which has been previously covered in whole or in part by metallic layer 124. An adhesive 128 is applied to foil 130 prior to bonding. In yet an alternate fabrication method for this embodiment, an adhesive 128 may be applied on top of the first carrier substrate 122. In yet another embodiment, the method of manufacturing such a security device may include placing an adhesive layer on both the first carrier substrate 122 over the magnetic region 126 as well as on the foil layer 130.

Figure 5B:
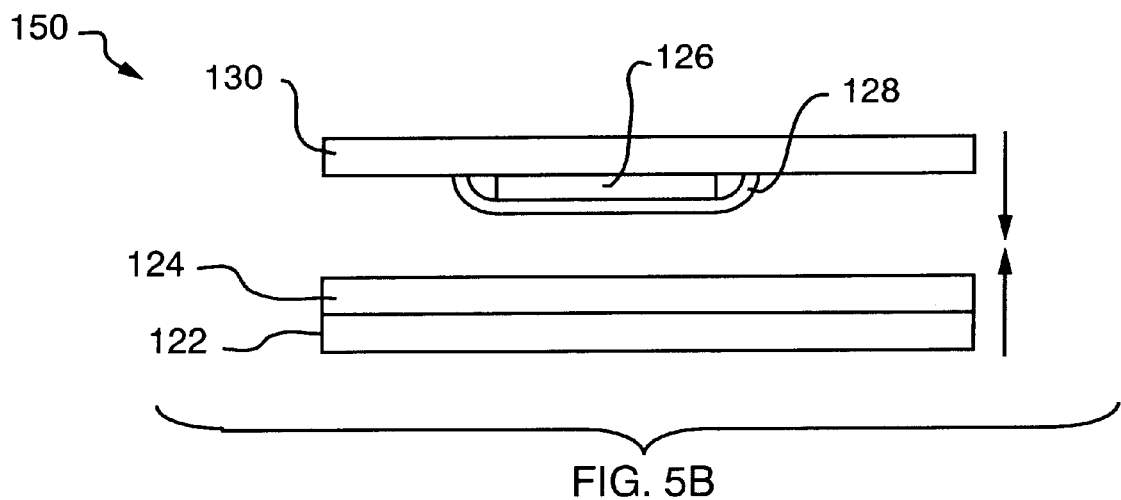
FIG. 5B is a schematic cross-section of a finished security device with embedded and camouflaged magnetic region, according to another embodiment of the present invention.

In yet another embodiment shown in cross-section 150, FIG. 5B, the magnetic region 126 and adhesive 128 maybe applied, by methods well-known to those skilled in the art including surface flooding, printing of magnetic media, or otherwise, directly onto foil 130 prior to bonding carrier substrate 122 with the metallic layer 124 to the foil film 130 including the magnetic region 126.

Figure 6:
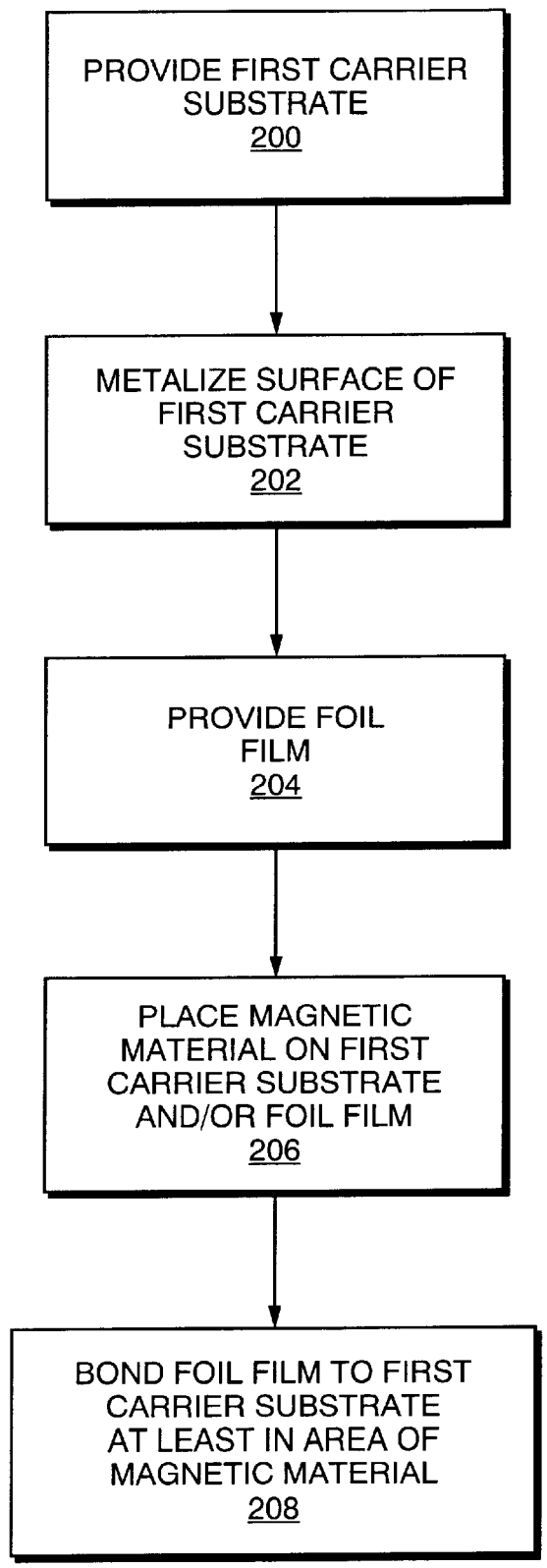
FIG. 6 is, a flow chart illustrating generally the method of constructing a security device according to the present invention.

Thus, according to the present invention, novel method is disclosed for fabricating a novel security device having a magnetic region embedded between metallic and foil layers. The method starts by providing a first carrier substrate act 200, FIG. 6. Next, at least one surface of the carrier substrate is metalized using well-known techniques, act 202. A foil film is also provided, act 204, which prior to bonding, is generally provided on a polyester carrier substrate with a release layer to facilitate releasing of the foil film from the carrier substrate.

At least one magnetic region is placed on either the first carrier substrate and/or the foil film, act 206. Without departing from the spirit of the present invention, a magnetic region or material could be provided on either or both of the first carrier substrate or the foil film. Additionally, the magnetic region or material may be selectively applied, with or without consideration of selectively applied metallic regions, or applied over the entire surface of the foil or the first carrier substrate layer. Finally, the foil film and the first carrier substrate are bonded together at least in the area of the magnetic material, act 208, by a process using heat and pressure such as provided by a set of heated dies. One or the other set of heated dies may be flat or patterned. Alternatively, a rotary die set, as is well known in the art, may also be utilized.

Accordingly, the present invention has provided a novel security device which camouflages, at least on one side, magnetically encodable material utilizing a foil film, thus camouflaging the magnetic regions, which can be encoded and subsequently decoded to prevent or at least thwart potentials counterfeiters from discovering their presence, decoding the information and successfully counterfeiting the device to which the object or item which the security device is intended to protect.

Modifications and substitutions by one ordinary skill in the art are considered to be within the scope of the present invention which is not to be limited expect by the claims which follow.

What is claimed is:

1. A magnetic/metallic security device for use with an item to provide multiple security features, said magnetic/metallic security device comprising:
   a carrier substrate having a width;
   at least one metallic region disposed on at least a portion of said carrier substrate;
   at least one metallic foil region disposed on at least a portion of a release coated carrier film, said metallic foil region having a top and bottom surface; and
   at least one magnetic region disposed on at least one of either said carrier substrate or said release coated carrier film, such that said at least one magnetic region is enclosed between said carrier substrate and said metallic foil region disposed on at least a portion of said release coated carrier film after said carrier substrate and said release coated carrier film are contacted under conditions that serve to bond the metallic and magnetic regions together.

2. The magnetic/metallic security device of claim 1 wherein said carrier substrate includes a plurality of conductive metallic regions separated by non-conductive regions.

3. The magnetic/metallic security device of claim 2 wherein said non-conductive regions extend entirely across said width of said carrier substrate.

4. The magnetic/metallic security device of claim 2 wherein said conductive metallic regions have at least two different predetermined lengths forming at least first and second metallic characteristics respectively, and performing a predetermined pattern representing data encoded by said metallic layer.

5. The magnetic/metallic security device of claim 4 wherein said predetermined lengths of said conductive metallic regions are detectable to read said predetermined pattern and decode said data encoded by said at least one metallic layer.

6. The magnetic/metallic security device of claim 1 wherein said at least one magnetic region is enclosed between said at least one metallic region disposed on at least a portion of said carrier substrate and said at least one metallic foil region disposed on at least a portion of a release coated carrier film after said carrier substrate and said release coated carrier film are contacted under conditions that serve to bond the metallic and magnetic regions together.

7. The magnetic/metallic security device of claim 6 wherein said at least one metallic region and said at least one magnetic region are in substantially identical registration.

8. The magnetic/metallic security device of claim 7 wherein said at least one metallic region and said at least one magnetic region in substantially identical registration include recesses.

9. The magnetic/metallic security device of claim 8 wherein said recesses form visually identifiable indicia.

10. The magnetic/metallic security device of claim 1 further including a plurality of magnetic regions, and wherein at least first and second ones of said plurality of magnetic regions include at least first and second types of soft magnetic pigments having first and second predetermined magnetic decay rates.

11. The magnetic/metallic security device of claim 10 wherein said at least first and second magnetic regions having said first and second predetermined decay rates are arranged in a predetermined pattern representing data encoded by said magnetic regions, such that said first and second predetermined magnetic decay rates are detectable to read said predetermined pattern and decode said data.

12. The magnetic/metallic security device of claim 11 wherein said first and second predetermined magnetic decay rates represent binary integers, and wherein said predetermined pattern of said at least first and second magnetic regions having said first and second predetermined magnetic decay rates represents data in a binary coded format.

13. The magnetic/metallic security device of claim 11 wherein said first and second types of soft magnetic pigments are capable of holding first and second predetermined levels of magnetism, wherein said magnetic regions having said first and second levels of magnetism are arranged in said predetermined pattern such that said first and second levels of magnetism are detectable to read additional data encoded by said magnetic regions.

14. The magnetic/metallic security device of claim 1 wherein said at least one magnetic region and said metallic region together form visually identifiable graphic indicia on at least a portion of said carrier substrate.

15. The magnetic/metallic security device of claim 14 wherein said visually identifiable graphic indicia is formed as magnetic metal graphic indicia readable my MICR detectors.

16. The magnetic/metallic security device of claim 1 wherein said at least one magnetic region is a composite including at least one of a heat and/or pressure activatable adhesive, and/or a chemical resist which serves to render said composite resistant to a metal reactant solvent.

17. The magnetic/metallic security device of claim 1 wherein at least one of a portion of said carrier substrate and said at least one metallic foil region disposed on at least a portion of a release coated carrier film include an adhesive coating.

18. The magnetic/metallic security device of claim 1 further including diffractive visual indicia.

19. The magnetic/metallic security device of claim 18 wherein said diffractive visual indicia includes holographic visual indicia.

20. The magnetic/metallic security device of claim 18 wherein said diffractive visual indicia includes an image formed by printing using an amplitude or phase varying or altering additive.

21. A method of making a magnetic/metallic security device for use with an item, to provide camouflaged multiple security features, said method comprising the acts of:
providing a carrier substrate having first and second surfaces;
applying a metallic layer to at least a portion of said first surface of said carrier substrate;
providing at least one metallic foil region disposed on at least a portion of a release coated carrier film;
providing at least one magnetic region disposed on at least one of either said carrier substrate or said release coated carrier film; and
contacting said carrier substrate to said metallic foil region such that said at least one magnetic region is enclosed between said at least one metallic region disposed on at least a portion of said carrier substrate and said at least one metallic foil region disposed on at least a portion of a release coated carrier film after said carrier substrate and said release coated carrier film are contacted under conditions that serve to bond the metallic and magnetic regions together.

22. The method of claims 21 wherein said act of contacting includes using a heated die, and wherein said heated die includes at least one flat die.

23. The method of claim 21 wherein said act of contacting includes using a heated die, and wherein said heated die includes at least one patterned die.

24. The method of claim 21 wherein said act of contacting includes using a heated die, and wherein said heated die includes at least one rotary die.

25. The method of claim 21 wherein said act of contacting includes using a heated die, and wherein said heated die includes one flat die and one patterned die.

26. The method of claim 21 further including before the act of contacting said first and second carrier substrates, the act of etching said at least one magnetic region and said at least one metallic layer such that at least a portion of said at least one magnetic region and said metallic region are in substantially identical registration and together form visually identifiable indicia on said security device.

27. The method of claim 26 wherein said at least one magnetic region is a composite including chemical resist which serves to render said composite resistant to a metal reactant solvent.

28. The method of claim 26 wherein said metallic layer is etched forming a plurality of conductive regions on said carrier substrate, and wherein said conductive regions are separated by non-conductive regions.

29. The method of claim 28 wherein said non-conductive regions extend across an entire width of said carrier substrate.

30. The method of claim 21 wherein said at least one magnetic region is disposed on said carrier substrate; wherein said at least one magnetic region is a composite including at least one of a heat and/or pressure activatable adhesive; and wherein said act of contacting causes said metallic foil to adhere to said at least one composite magnetic region.

31. The method of claim 21 wherein said at least one magnetic region is disposed on a bottom surface of said at least one metallic foil region disposed on at least a portion of a release coated carrier film.

32. The method of claim 21 wherein said at least one magnetic region is disposed on said carrier substrate.

33. A magnetic/metallic security device made in accordance with a method comprising the acts of:
providing a carrier substrate having first and second surfaces;
applying a metallic layer to at least a portion of said first surface of said carrier substrate;
providing at least one metallic foil region disposed on at least a portion of a release coated carrier film;
providing at least one magnetic region disposed on at least one of either said carrier substrate or said release coated carrier film; and
contacting said carrier substrate to said metallic foil region such that said at least one magnetic region is enclosed between said at least one metallic region disposed on at least a is portion of said carrier substrate and said at least one metallic foil region disposed on at least a portion of a release coated carrier film after said carrier substrate and said release coated carrier film are contacted under conditions that serve to bond the metallic and magnetic regions together.

34. A magnetic/metallic security device for use with an item to provide multiple security features, said magnetic/metallic security device comprising:
a carrier substrate having a width;
at least one metallic region disposed on at least a portion of said carrier substrate;
at least one metallic foil region disposed on at least a portion of a release coated carrier film, said metallic foil region having a top and bottom surface; and at least one magnetic region disposed on at least one of either said carrier substrate or said release coated carrier film, such that said at least one magnetic region is enclosed between said at least one metallic region disposed on at least a portion of said carrier substrate and said at least one metallic foil region disposed on at least a portion of a release coated carrier film after said carrier substrate and said release coated carrier film are contacted under conditions that serve to bond the metallic and magnetic regions together.

* * * * *